(12) United States Patent
Gordin et al.

(10) Patent No.: US 6,929,385 B2
(45) Date of Patent: Aug. 16, 2005

(54) APPARATUS AND METHOD FOR INCREASING LIGHT OUTPUT OVER OPERATIONAL LIFE OF ARC LAMP

(75) Inventors: Myron K. Gordin, Oskaloosa, IA (US); Timothy J. Boyle, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 14 days.

(21) Appl. No.: 10/327,732

(22) Filed: Dec. 23, 2002

(65) Prior Publication Data

US 2003/0151918 A1 Aug. 14, 2003

Related U.S. Application Data

(60) Provisional application No. 60/343,036, filed on Dec. 21, 2001.

(51) Int. Cl.[7] .............................. F21V 29/00; H01J 7/24
(52) U.S. Cl. ........................ 362/294; 362/261; 362/269; 362/264; 315/112
(58) Field of Search ................................ 362/261–262, 362/294, 373, 269, 271–272, 264; 315/112, 118; 313/318.02, 318.11

(56) References Cited

U.S. PATENT DOCUMENTS

| | | | | |
|---|---|---|---|---|
| 2,155,279 | A | * 4/1939 | McMahan ................. | 110/189 |
| 3,753,019 | A | 8/1973 | Hellman | |
| 4,173,038 | A | * 10/1979 | Kiefer ..................... | 362/35 |
| 4,734,835 | A | * 3/1988 | Vines et al. .............. | 362/264 |
| 4,978,891 | A | 12/1990 | Ury | |
| 5,134,557 | A | 7/1992 | Gordin et al. | |
| 5,211,473 | A | 5/1993 | Gordin et al. | |
| 5,339,224 | A | 8/1994 | Woehler | |
| 5,404,076 | A | * 4/1995 | Dolan et al. ............. | 313/572 |
| 5,568,007 | A | 10/1996 | Yamura et al. | |
| 5,856,721 | A | 1/1999 | Gordin et al. | |
| 5,998,934 | A | 12/1999 | Mimasu et al. | |
| 6,072,268 | A | 6/2000 | Dolan et al. | |
| 6,249,077 | B1 | 6/2001 | Brown et al. | |
| 2003/0151918 | A1 | 8/2003 | Gordin et al. | |

FOREIGN PATENT DOCUMENTS

| | | |
|---|---|---|
| EP | 0897190 A2 | 2/1999 |
| EP | 0 897 190 A2 | 2/1999 |
| JP | 1225002 | 7/1989 |
| JP | 01225002 | 9/1989 |
| JP | S63-50716 | 9/1989 |
| JP | 3-83037 | 1/1991 |
| JP | 03-48836 | * 3/1991 |
| JP | 4-342920 | 11/1992 |
| JP | 043442920 | 11/1992 |
| WO | PCT/US02/41080 | 12/2002 |
| WO | WO 03/060379 A2 | 7/2003 |

OTHER PUBLICATIONS

Patent Abstract of Japan re JP1225002 (2 pages.

* cited by examiner

*Primary Examiner*—Sandra O'Shea
*Assistant Examiner*—Ali Alavi
(74) *Attorney, Agent, or Firm*—McKee, Voorhees & Sease, P.L.C.

(57) ABSTRACT

An apparatus and method for increasing operational life and performance of an arc tube or lamp. The method includes operating the arc tube and applying steps to encourage isothermal conditions around the arc tube. In one embodiment of the method, the arc tube (12) is rotated (40/41) during operation. Another embodiment includes directing air (32/34/26) onto the operating arc tube (12). An exemplary embodiment relates to a substantially high wattage HID unjacketed double ended arc lamp (12) operated in a substantially horizontal position, but the invention is not limited to the same.

15 Claims, 11 Drawing Sheets

APPARATUS AND METHOD FOR INCREASING LIGHT OUTPUT OVER OPERATIONAL LIFE OF ARC LAMP

REFERENCE TO RELATED APPLICATION

This application is based upon U.S. Provisional Application Ser. No. 60/343,036, filed Dec. 21, 2001.

INCORPORATION BY REFERENCE

The contents of U.S. Provisional Application Ser. No. 60/343,036, filed Dec. 21, 2001; U.S. Regular Application Ser. No. 10/072,703, filed Feb. 7, 2002; U.S. Pat. No. 5,856,721, issued Jan. 5, 1999; U.S. Pat. No. 5,211, 473, issued May 18, 1993; and U.S. Pat. No. 5,134,557, issued Jul. 28, 1992, are incorporated by reference in their entirety.

I. BACKGROUND OF INVENTION

A. Field of Invention

The present invention relates to high intensity discharge (HID) lamps. One type of HID lamp of particular interest is metal halide (MH) arc lamps, whether jacketed or unjacketed.

B. Problems in the Art

Larger lighting fixtures, like sports field lights 2 (see, e.g., FIGS. 1 and 2) use very high wattage HID (High Intensity Discharge) lamps 4 to generate high-intensity light to travel the substantial distances from the fixtures to the field 5. The cost of such lighting is substantial. The light fixtures usually must be elevated, on cross arms 7 on poles 6 or other structures, which is costly. Sometimes the poles must be located a substantial distance from the field, e.g. because of spectator stands 8 surrounding the field. A limited number of fixtures can be elevated per pole because of wind load and other factors. Therefor, the more fixtures required to adequately light a filed, the more cost of not only fixtures, but structure to elevate them, which can represent a significant part of the total cost of a system as shown in FIG. 1. Also, each lamp and fixture adds expense; namely structure and electrical cost to operate.

Thus, a continued goal for such fixtures is to improve economy and efficiency. One way is to get more light out of each fixture. It then might be possible to reduce the total number of fixtures, which would result in less cost to elevate and to electrically power the whole set of lights. Many times, there are 30, 40, or more fixtures. A reduction by 10 or 15 fixtures could result in huge savings.

Another approach at getting more light to the sports field with fewer fixtures is to use larger wattage lamps. Larger wattage lamps can pump out more light energy per fixture. Traditional sports lighting lamps can be in the 500 to 1500 watt range. There are now available HID arc lights in the 2000-watt range.

One example of a 2000 watt sports lighting fixture is disclosed in co-pending U.S. Ser. No. 10/072,703, incorporated by reference herein. The basic structure of such a fixture is illustrated at FIG. 2. A bowl-shaped reflector 30, with a glass lens 31, surrounds a 2000 watt MH arc lamp 12. Mounts 22L and 22R allow arc tube 12 (unjacketed) to be removably placed into the position shown. Reflector 30 and the parts within are connected to a mounting mogul or housing 3 (here with an integrated ignitor circuit), which in turn is adjustably connected to a mounting elbow 4. Elbow 4 can be mounted to a cross arm 7 or other structure. The fixture 2 can thus be elevated by suspension from such a cross arm, but can be adjusted relative the cross arm to aim it to a certain location or direction relative the field.

However, although such high-powered lamps are available, there is still room for improvement. The nature of arc lamps is that most lose light output over time. They are brightest over a first period of time (for 1000–2000-watt fixtures, approximately the first 100 hours of operation). It is believed that there is a gradual reduction in light output as chemicals inside the arc precipitate out or migrate and interact with chemicals in the quartz or other parts of the light structure. During this initial period, on the order of 25% loss of light output can occur.

Then, over a second period (the remaining lamp life), a further gradual reduction in light output can and usually does occur. By the end of conventional lamp life (many times several hundred hours) there can be on the order of an additional 50% light loss or depreciation. Thus, by the end of conventional lamp life, combined light depreciation from those two periods of time, can be on the order of one-third to one-half of the original light output.

Therefore, most sports lighting systems, which have to maintain certain level of quantity and quality of light across the filed, are designed to have an excess number of light fixtures. This results in higher initial cost and initial inefficiency of excess light, but hopefully produces enough light over time despite the light depreciation problem discussed above.

If one reduces the number of fixtures designed or relied upon for lighting a field because of use of higher wattage lamps, the light depreciation described above, over time, may reduce total light output below what is required, desired, or designed for that particular field. It is usually not an answer to replace the lamps after only 50 hours or less of operation time because it is too expensive (these lamps can cost tens, if not hundreds, of dollars apiece). Thus, to insure adequate lighting levels, even toward the end of normal lamp lifetime, most lighting system designers add additional light fixtures, which of course, adds back cost into the system and is counter to the goal of increasing economy.

It is therefore an object, feature, or advantage of the present invention to provide an apparatus and method directed to stopping or reducing the light output loss or depreciation over the life of these types of lamps. It is believed that at least a portion of light depreciation is the result of uneven temperature around the quartz arc tube that encases the arc.

The basic structure of this type of arc tube source is shown at FIG. 3, and is well known in the art. A quartz arc tube 12 has a sealed interior chamber, which contains certain chemicals. Two electrodes 14 extend into opposite ends of the hollow interior chamber of arc tube 12. Part of each electrode 14 is encased in an associated pinched end 16 of arc tube 12. Pinched ends 16 can be mounted in insulators (e.g. ceramic) 18. Electrodes 14, or conducting members (e.g. metal ribbon) connected to electrodes 14, extend into or through insulator 18. The opposite pinched ends 16 of arc tube 12 are sealed to or mounted in members 18. Electrical energy is supplied to arc tube 12 through high temperature electrical leads (not shown) that extend into insulators 18 and are in electrical communication with electrodes 14.

During operation, electrical power is supplied to electrodes 14. An electrical arc forms between electrodes 14 inside of arc lamp 12. In the operative position shown in FIG. 3 (horizontal), arc stream 20 usually "arcs" such that its middle section is closer to the top of the arc tube 12 than to the bottom. It appears this phenomenon results in unequal temperature between top and bottom of arc tube 12. Heat energy from arc stream 20 heats the top of arc tube 12 hotter than the bottom. Many times the difference can be substantial; e.g., approximately 1000° C. temperature at the top and 600° C. temperature at the bottom of arc tube 12.

This unequal temperature is believed to result in at least some of the chemicals in arc tube 12 finding cooler parts of the arc tube. They can precipitate out and, thus, reduce light output because they are no longer active chemicals in the generation of the arc stream and/or precipitate out and deposit on the inside of the arc tube 12 and actually block light from escaping from arc tube 12.

Another phenomenon which is believed to occur is that the unequal temperature may cause some of the chemicals in the quartz to migrate into the interior open space of the arc tube and combine with the chemicals inside the arc tube in a manner that removes them from light generation and/or results in light blocking deposits.

Therefore, a goal, object, feature and/or advantage of the invention is to attempt to reasonably equalize the temperature around the entire quartz arc tube 12 to reduce temperature differential between parts of the arc tube 12. This will also be called attempting to promote isothermal conditions all around the arc tube.

Other objects, features, and/or advantages of the present invention include an apparatus and method which:

a. Promotes temperature of at least a part of an arc tube to enhance performance of the arc tube and/or lamp associated with the arc tube;
b. Promotes temperature of at least a part of an arc tube to prolong operational life of the arc tube or lamp associated with the arc tube;
c. Allows adjustment of operating characteristics, structure, or components of arc tube to increase or maximize light output and maintenance of light output over the operating life of the arc tube or lamp associated with it, while reducing detrimental or deteriorating effects of such increase or maximization;
d. Improves maintenance of light output over time when operating an arc tube;
e. Is relatively economical, efficient, flexible, and durable.

These and other objects, features, and/or advantages of the invention will become more apparent with reference to the accompanying specification and claims.

II. SUMMARY OF INVENTION

The present invention includes an apparatus and method to promote improved performance of HID lamps. In a method according to one aspect of the invention, an HID lamp is operated. During operation of the lamp, steps are taken to promote isothermal conditions around the arc tube. One example of such steps is rotation of the arc tube. Another is the provision of cooling fluid to or around the arc tube. In an apparatus according to one aspect of the invention, an HID arc tube is operatively installed in a fixture. Means or a mechanism is/are included to promote isothermal conditions around the arc tube while it operates.

The present invention also relates to utilizing steps or apparatus to alter the temperature around an HID arc tube, or selected areas, to alter performance of the arc tube.

III. BRIEF DESCRIPTION OF DRAWINGS

IV. DETAILED DESCRIPTION OF EXEMPLARY EMBODIMENTS

A. Overview

Figure 1:
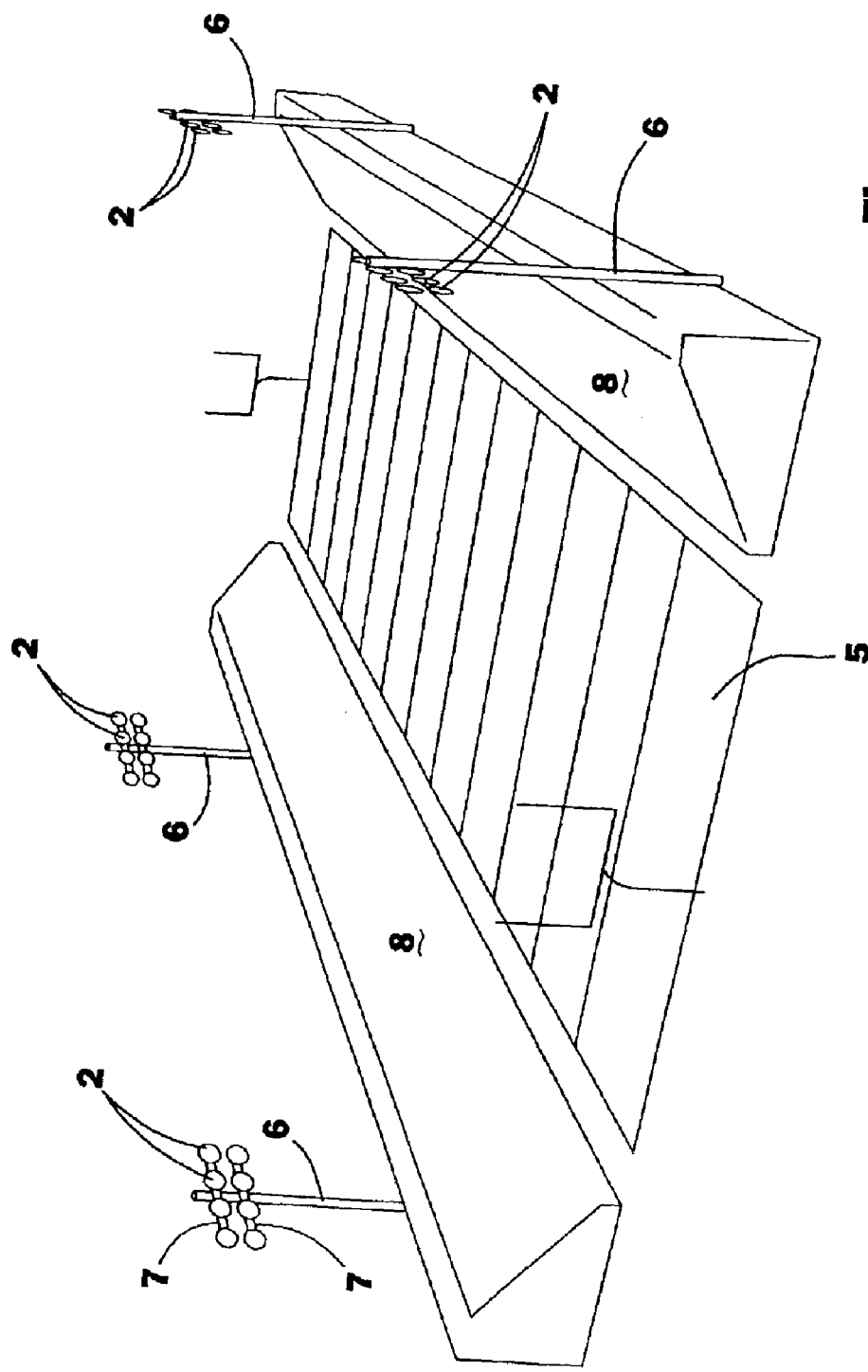
FIG. 1 is a diagrammatic, simplified perspective view of an exemplary athletic field and a typical sports lighting system with a plurality of poles each elevating a plurality of light fixtures equipped with HID arc tubes.

To gain a better understanding of the invention, a detailed description of exemplary embodiments will now be set forth. Frequent reference will be taken to the above-identified drawings. Reference numbers and letters will be used to indicate certain parts and location in the drawings. The same reference numbers will indicate the same parts or locations throughout the drawings unless otherwise indicated.

The exemplary embodiments will be discussed in the context of wide area lighting, and in particular, to sports field lighting of the general type illustrated in FIG. 1. However, the invention is not limited to that application. Other examples include, but are not limited to, parking, roadway, safety, or special events lighting. But the invention can also be applied to interior lighting, and thus, to fixtures of somewhat smaller size and power consumption.

The exemplary embodiments also relate to use of high wattage metal halide arc lamps, both jacketed and unjacketed, and both single-ended and double-ended. However, the invention is not necessarily limited to that type of HID lamp, or the types of fixtures depicted herein. The methods and apparatus according to the invention are believed applicable to a wide range of wattage HID lamps, whether jacketed or unjacketed, single-ended or double-ended, or a variety of sizes, shapes, and construction, and of a variety of chemical compositions in the arc tube.

Furthermore, the exemplary embodiments illustrate arc lamps operated generally horizontally and across the aiming axis of the reflector, or operated at an angle below horizontal along the aiming axis of the reflector. The methods and apparatus according to the invention pertain to any orientation of the arc tube relative to a reflector and its aiming axis and relative to earth. For example, the invention pertains to any operational position relative to earth, including horizontal and vertical. It pertains to an operational position on the aiming axis of the reflector or angularly offset therefrom in any direction, including across the aiming axis of the reflector.

Figure 4:
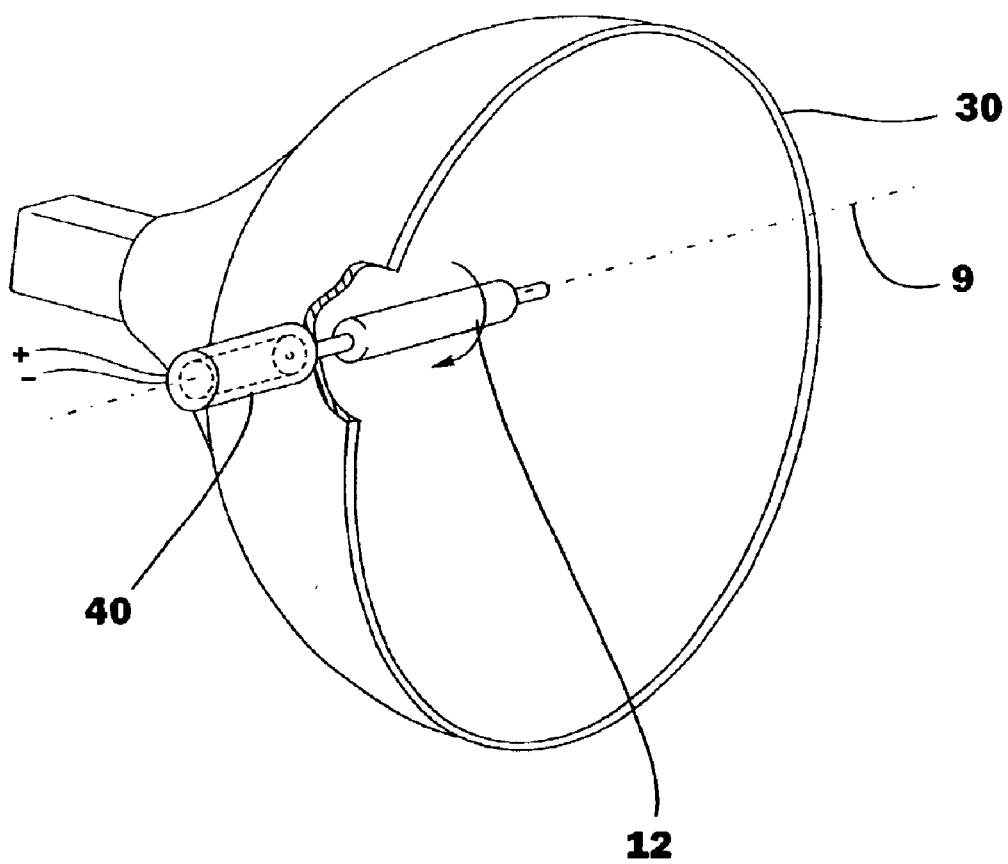
FIG. 4 is a simplified, reduced in size, diagrammatic view of the fixture of FIG. 2, including a system to rotate the arc tube during operation.
Figure 5:
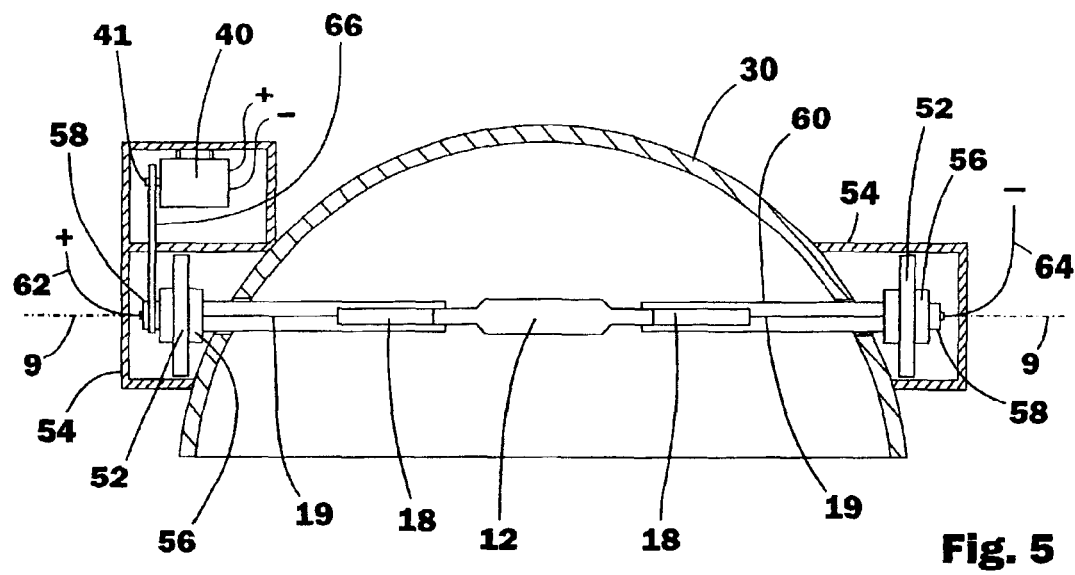
FIG. 5 is a top sectional, more detailed view of the fixture of FIG. 4.
Figure 6:
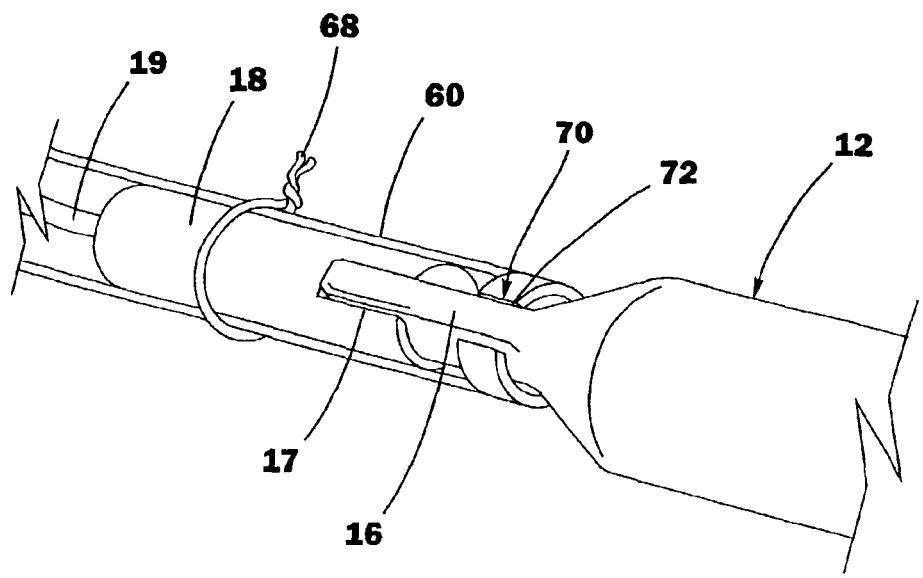
FIG. 6 is an enlarged partial perspective view of one end of the arc tube of FIG. 5.

B. Exemplary Embodiment Example 1—Rotating Arc Tube During Operation to Equalize Temperature Around Arc Tube 1. FIGS. 4–6 (Double-Ended, Unjacketed Lamp/Electric Motor)

Figure 2:
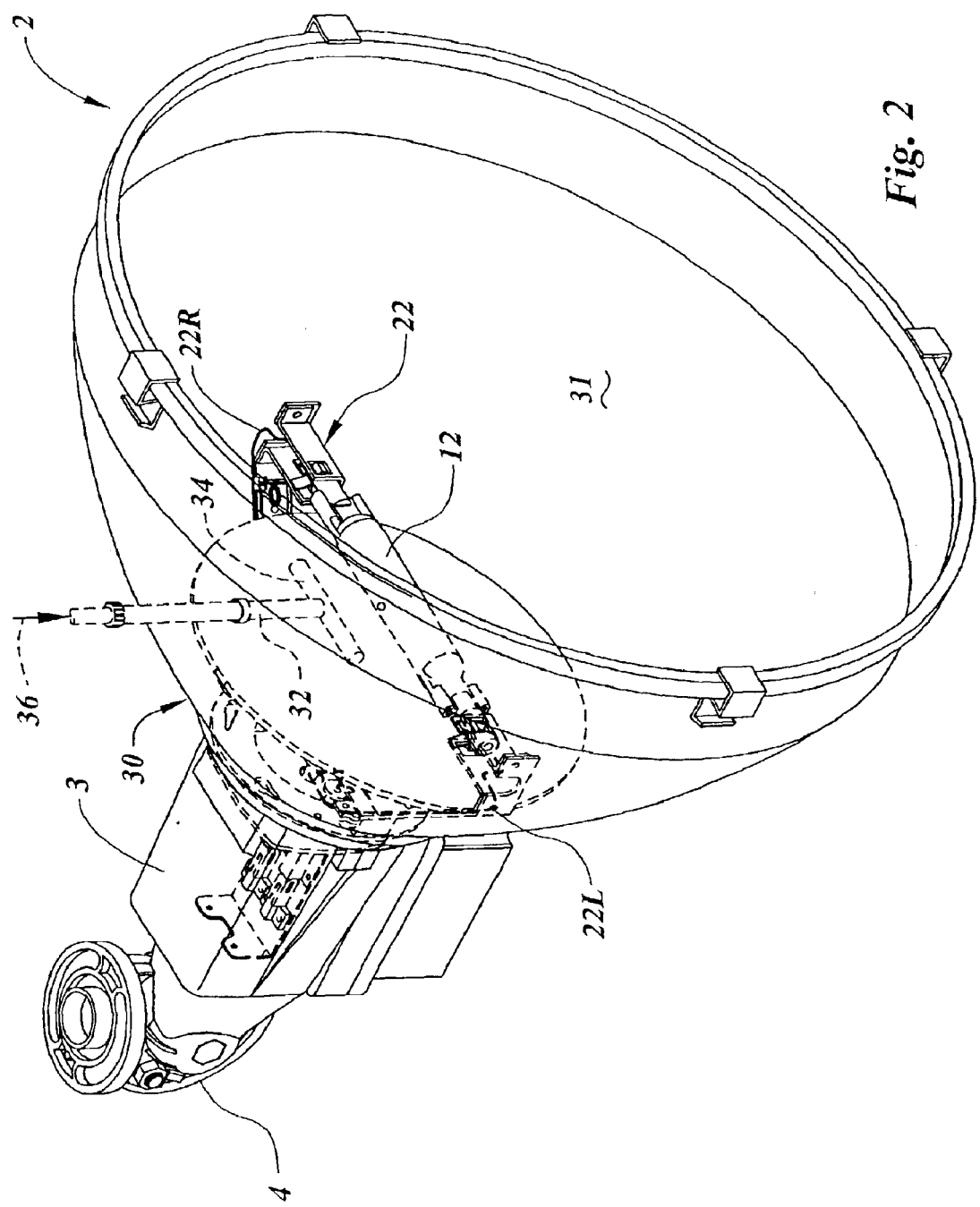
FIG. 2 is an enlarged perspective view of an example of a light fixture that might be used with the lighting system of FIG. 1. In this example, the light source for the fixture is an unjacketed, double-ended high wattage metal halide arc tube normally operated in a generally horizontal position.

FIG. 4 illustrates diagrammatically, in very simplified form, a light fixture, e.g. of the type of FIG. 2, having a generally horizontally positioned double-ended, unjacketed metal halide arc tube 12 (e.g. 2000 watt) operatively positioned within a reflector 30. The mounting structure for electrical connections to arc tube 12 are not shown for simplicity. Note that arc tube 12 is unjacketed; meaning there is no glass bulb or envelope around arc tube 12. More details of a fixture of this type can be found at co-pending, co-owned U.S. Ser. No. 10/072,703, incorporated by reference herein. It is to be understood that the principals discussed with regard to this unjacketed, double-ended lamp example apply as well to jacketed double-ended lamps, jacketed single-ended lamps, and unjacketed single-ended lamps, or other configurations.

In this example, arc tube 12 is generally tubular (with pinched off ends) and elongated along a linear axis, and has a generally "cigar" shape. The invention is not necessarily limited to that configuration.

Figure 3:
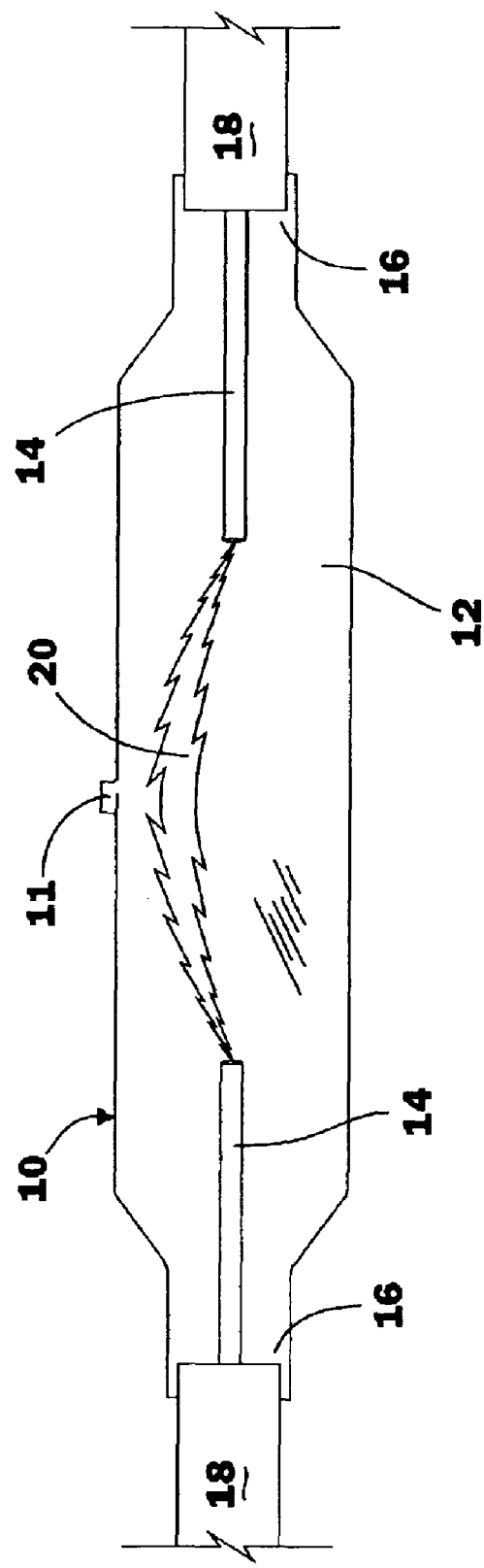
FIG. 3 is a still further enlarged front elevation diagrammatic view of the arc tube of FIG. 2, illustrating operation of the arc stream when the arc tube is in a generally horizontal position.

An electric motor 40 is connected to one end of arc tube 12 and rotates it. Testing indicates that rotation at a relatively slow rate (e.g. from a fraction of an RPM to less than ten RPM) is sufficient. Arc tube 12 would be appropriately supported to allow it to rotate without substantial resistance, yet maintain its position relative the fixture in normal operating conditions for such fixtures. By rotating arc tube 12, the entire circumference of arc tube 12 would be moved past the upwardly bowed arc stream 20 (see FIG. 3). On average, during such operation (and if rotated at a relatively constant rate), most parts of the arc tube should receive a similar amount of heat energy, leading to or promoting equal or isothermal conditions around the arc tube.

Electrical power is readily available, even at the top of a tall light pole, because electrical power is required to power the arc tubes. Low power, AC or DC electrical motors, are readily available from a variety of vendors and are relatively low cost. Motor 40 is enclosed within an appropriate housing for its environment. For example, the housing can be constructed to protect the motor and associated parts from an outdoors environment. It could be ruggedized and/or weather-proofed. The power needed to rotate arc tube 12 is relatively small. And, since low RPMs are preferable, there is not substantial wear of parts. Thus, relatively inexpensive motors would appear to be satisfactory.

FIGS. 5 and 6 provide an example, in more detail, of how arc tube 12 could be mounted and rotated in this manner. An elongated assembly, which includes arc tube 12, could be rotatably mounted along rotational axis 9 at opposite ends in bearings 56 (e.g. plastic), which are in turn supported in bearing blocks 52 which are rigidly mounted or a part of housings 54 (which are mounted to reflector 30).

The very opposite ends of the rotational assembly extend outside of bearings 56. Those very opposite ends of tubes 60 can include what are known as slip rings, rotary joints, or rotary electrical interfaces 58, and commercially available from a wide variety of sources and manufacturers. A motor 40, via cogged or toothed belt 66 (or other connection), can be operated to rotate the elongated assembly in its opposite bearings 56. Thus, one low powered, AC or DC motor could, by appropriate circuitry, turn on during operation of arc tube 12 to slowly rotate arc tube 12 in fixture 2.

The elongated assembly that is rotated, in this embodiment, includes arc tube 12 and two tubular (e.g. aluminum) members 60. As is conventional, an arc tube 12 of this type normally has a central quartz body that encases opposite electrodes 14 (see FIG. 3). Pinched ends 13 (see FIG. 6) of the quartz body are mounted in insulators 18. Electrical leads (usually covered with insulation—see ref. No. 19 in FIG. 6) extend out of the insulators 18. and are normally connectable to electrical power to cause the arc tube to generate light. As shown in FIGS. 5 and 6, the two bearing blocks 52 could be built into housings 54 on the exterior of opposite sides of reflector 30. The insulators 18 of arc tube 12 can be laid into adjacent ends of a pair of tubes 60 and secured in place by a clip or bracket 68 (see FIG. 6) or another fastening or securement member or method. In FIG. 6 clip 68 is diagrammatically illustrated as a wire to show that the mechanism can have some adjustability and can be removed. In practice, the clip would not be a wire but rather some type of formed clip or bracket that can hold arc tube 12 in place in tubes 60 maintain the assembly in a relatively rigid, integrated elongated combination, and withstand the heat and environment. Each tube 60 has a portion removed (essentially creating a half tube along a part of its length) to allow the insulator 18 to be placed as shown in FIG. 6.

The inward facing ends 70 of tubes 60 could be substantially tubular around their perimeter except for a longitudinal slot 72, which would be just wide enough to receive the pinched portion 16 of arc lamp 12. This structure allows arc tube 12 to be installed into adjacent ends of the two tubes 60 and secured in place. The combination of pinched end 16 in slot 72 of each tube, creates a non-slip joint between tubes 60 and arc tube 12. The combination of arc tube 12 and tubes 60 therefore essentially comprises an integrated, elongated member that can be rotational driven by motor 40. Other ways, of course, are possible to grip or connect to arc tube 12 and then rotate it. For example, insulators 18 could be clamped or gripped by members that extend to opposite rotational bearings. Other ways are possible.

As indicated above, electrical power to arc tube electrodes 14 can be supplied, despite rotation of arc tube 12, by simply using rotary electrical junctions, joints or interfaces at each end of the elongated assembly.

Such rotary junctions, sometimes called slip rings, are available from a wide variety of vendors off-the-shelf, even for high power applications. A slip ring is an electromechanical device that allows the transmission of power and electrical signals from a stationary to a rotating structure. Also called a rotary electrical joint, collector or electric swivel, a slip ring can be used in any electromechanical system that requires unrestrained, intermittent or continuous rotation while transmitting power and/or data. Examples are available from such commercial sources as Meridian Laboratories of Middleton, Wis. and Electro-Tec Corporation of Blacksburg, Va. One vendor that sells a variety of brands is McMaster-Carr Supply Company, having locations throughout the United States, including Chicago, Ill. Operational and other features of such slip rings can be specified by the purchaser and depend upon application. Therefore, the specifics of such an electric junction are not provided here, but shown diagrammatically by indicating one polarity of electrical power (ref. no. 62 in FIG. 5) can enter rotary connection 56, and an opposite polarity (ref. no. 64) at the other rotary connection 56, and supply electrical power to arc lamp 12 even though it rotates. But, for example, there are capsule rotary electrical junctions, which have stator, rotor, and bearings all encased in a housing that could be sealed and weatherproofed. On the other hand, what are called separates are individual stators, rotors, or bearings that can be constructed and combined as desired. Also, such things as the amount of torque desired can be specified by the designer. Some electrical rotary junctions do not have slip rings or other structure that allow complete rotation of rotor relative to stator, but rather allow a limited angular rotation (e.g. 540 or less degrees) and then require return. FIG. 5 is intended to illustrate that the slip ring could be relatively small (on the order of one inch diameter), with electrical contacts arranged axially of the rotational axis of arc tube 12. Other types and configurations are possible depending upon the particular application. Surge protection may be added to the circuit including the slip rings.

The configuration of FIG. 5 allows one end of one of tubes 60 to be rotationally driven, which would rotate the entire combination of left tube 60, arc tube 12, and right tube 60 (see FIG. 5). Belt 66 could be a cog belt (e.g. urethane) or a chain or other continuous member between motor axle 41 and an end of a tube 60. Other rotary drive configurations are, of course, possible. For example, gears could be used between the motor output shaft and the assembly holding arc tube 12, or gears could be used in combination with other structure to translate rotary action of the motor to turn the arc tube. The rotation output (speed, torque, etc.) can be selected according to need or desire, and, through translation methods and structure, delivered to the arc tube. The rotational speed of the arc tube can differ from the output of the motor. This allows flexibility, in that the motor speed can be selected relatively independent of the desired arc tube rotational speed, and the difference taken care of through the translation process. Rotation of the arc tube can thus be chosen or changed or adjusted without necessarily having to change motors. Multi-speed or adjustable motors are also possible.

Thus, the arc stream of arc tube 12, which arcs vertically upward, would be continuously brought closer to the exterior of the entire arc tube 12, as it rotates past, during operation of the lamp.

No substantial limitation on rotational speed is believed to exist. Rotation of even a small fraction of one rpm is indicated as beneficial. This quite slow speed may even be preferable for certain situations. On the other hand, relatively higher speeds of one revolution a second (60 RPM) or more, would likely require more robust and expensive components. Therefore, there is not only flexibility but trade-offs in deciding the rotational speed for an application.

For example, it has been found that relatively slow rotation (e.g. ⅓ of 1 RPM to 5 RPM) can work to promote equal heating of the entire arc tube 12 of the general type and application in the embodiments of the Figures, as well as burn off chemicals which continuously precipitate out on the inside of the arc tube 12. One to three RPM seems to work adequately for different lamps of these types. Thus, whatever uneven heating might occur in arc tube 12 is attempted to be compensated by rotating arc tube around the arc stream. However, the invention is not limited to such rotational speed. For example, the size of the arc tube may dictate a different speed, e.g., smaller diameter arc tubes may be able to be rotated at slower speeds, and larger diameters at higher speeds. A number of factors and considerations, including some practical considerations, are usually relevant in selecting rotational speed.

Figure 7:
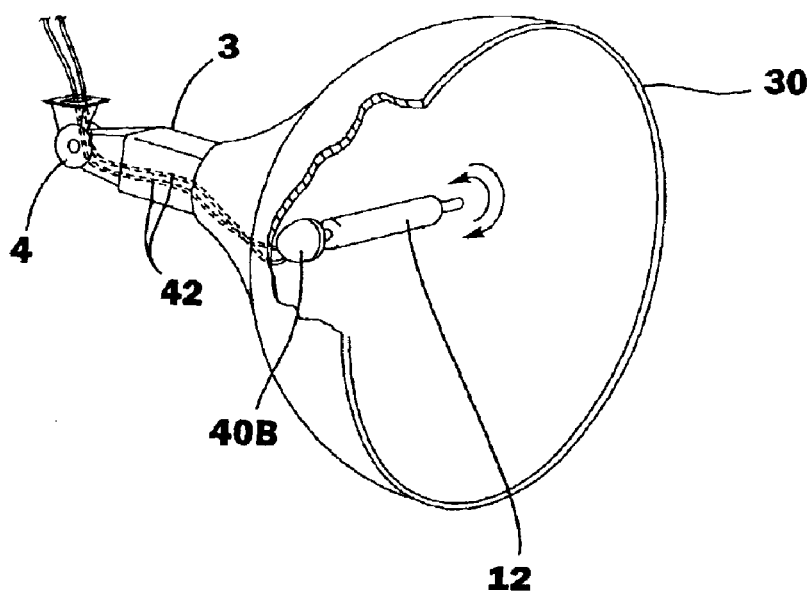
FIG. 7 is similar to FIG. 4, but shows an alternative mechanism to rotate the arc tube.
Figure 8:
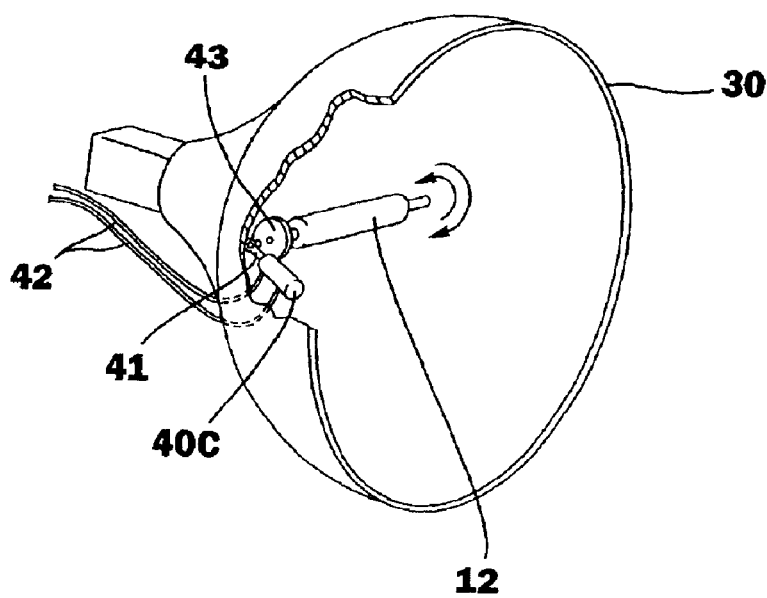
FIG. 8 is similar to FIG. 4, but shows an alternative mechanism to rotate the arc tube.

2. FIGS. 7–8 (Double-Ended, Unjacketed Lamp/Pneumatic Motor)

FIGS. 7 and 8 illustrate diagrammatically that rotation of arc lamp twelve could be accomplished with other power sources. In these example, pneumatic power is used. Pneumatic power could be used to rotate or oscillate the arc tube (might use as little as ½ PSI to operate) instead of a AC or DC electric motor. FIG. 7 illustrates an off-the-shelf pneumatically driven rotary motor or actuator 40B operatively connected to arc tube 12. Pressurized air can be provided via air tube or tubes 42 (which could be passed interiorly or exteriorly of the fixture). Available from a variety of commercial sources, such pneumatic rotary actuators could rotate arc tube 12 repeatedly in one direction. This may require linkage between the motor and the arc tube, e.g. rack and pinion, toothed belt and drive wheel, etc., as many pneumatic actuators produce linear motion, or rotary motion over a limited angular range.

On the other hand, it may be elected or desirable to rotate the arc tube a certain limited angular range in one direction, and then back in the opposite direction the same amount, and then repeat; i.e. oscillation. Doing so over a 180 degrees angle would allow the entire arc tube circumference to be passed by the upward bow of the arc stream, with a similar result to complete rotation. FIG. 7 indicates this possible option of oscillation (see arrows in FIG. 7). Instead of rotation in the same direction, arc tube 12 could be rotated first in one direction, and then back in an opposite direction (e.g. 180 degrees). Oscillation (e.g. rotation 180° one way and 180° back, or some other angle) might make the structure to rotate the arc tube less complex and less expensive.

FIG. 8 shows an alternative, a linear air cylinder 40C, that when operated extends and retracts piston 41. This could rotate a gear, eccentric or member on the end of arc tube 12, which would rotate arc tube 12 around its longitudinal axis. This arrangement could turn arc tube 12 in one direction, or could be set up to oscillate arc tube 12, as previously discussed.

A further option would to intermittently turn or oscillate arc tube 12, as opposed to continuously rotating it in one direction. One example would be to turn it upside down every time the lamp is turned on. It is believed that this could reduce some light depreciation over the life of the lamp and would make it simpler to control. Another example would be to rotate or oscillate for a limited period of time, or only intermittently during operation of arc tube 12. Another example is to rotate the lamp for a certain period of time, stop rotation for a period of time, and then repeat. The rotation and non-rotation times could be the same or different. Or they could be changed over the operation life of the lamp.

Thus, it can be how the embodiments of FIGS. 4–8 attempt to avoid or reduce the depreciation in light output of high intensity discharge arc tubes over their operating life by attempting to equalize temperature around the entire quartz arc tube.

3. FIGS. 9–12 (Single-Ended Jacketed Lamp/Electric Motor)

FIGS. 9–12 illustrate a slightly different HID light source from that disclosed in FIGS. 1–8. By referring to FIGS. 9 and 10, in this embodiment, arc tube 12 (with electrodes 14) is jacketed or encased in a glass bulb or envelope 13, sometimes called a single-ended jacketed lamp. A screw-in electrically conductive male member 24 on the end of the lamp allows this light source to be screwed into a receiver 46 (see FIG. 10). Receiver 46 is connected to a member 44, which is intended to diagrammatically indicate a rotatable member. Rotation of member 44 causes rotation of receiver 46 and the lamp of FIG. 10, when screwed into receiver 46.

Figure 9:
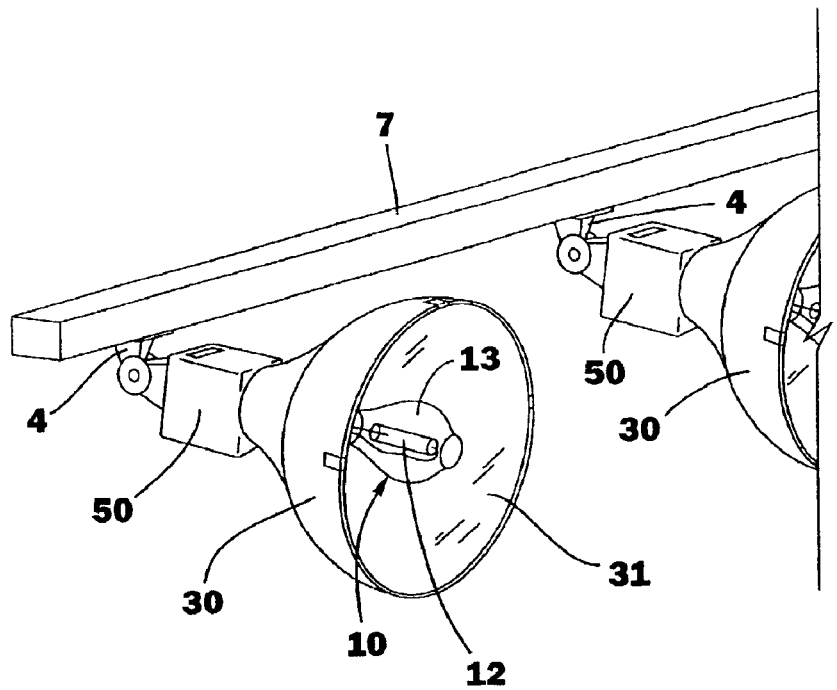
FIG. 9 is a perspective depiction of an alternative embodiment of a light fixture for rotating a jacketed, single-ended arc lamp during operation.
Figure 10:
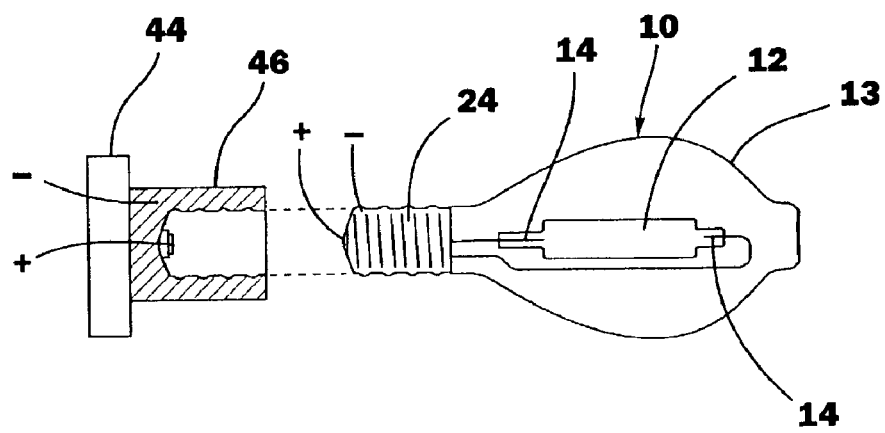
FIG. 10 is an enlarged side elevation depiction of a jacketed, single-ended arc lamp and a rotatable receiver for the lamp for the embodiment of FIG. 9.

As shown in FIG. 9, reflector 30 surrounds the combined screw-in arc tube 12/lamp 13. An example of such a single-ended, jacketed HID lamp is disclosed at U.S. Pat. No. 5,211,473, incorporated by reference herein. This arrangement results in arc tube 12 being along the central aiming axis of reflector 30. As can be appreciated, when the aiming axis of the reflector and the longitudinal axis of the arc tube are coincident, rotation of the arc tube around its longitudinal axis will not substantially affect the light pattern issued out of the reflector, as could occur if the arc tube was rotated about a lateral axis. Therefore, it is generally preferable to rotate the arc tube around its axis of elongation. However, rotation can occur whether or not the arc tube is operated in a horizontal position, which is the position of operation illustrated in the embodiment of FIGS. 1–8. In the embodiment of FIGS. 1–8, the arc tube is generally horizontal, but is transverse to or lateral across the aiming axis of the reflector (which would extend out from the center of bowl-shaped reflector 30 in FIGS. 1–8. But further, as shown in FIGS. 9–12, the arc tube may be operated at an angle away from horizontal but along the aiming axis of the reflector, and rotated around its longitudinal axis. But still further, the arc tube could be positioned neither lateral to or aligned with the aiming axis of the reflector. An example is illustrated at FIGS. 7 and 19 of U.S. Pat. No. 5,134,557, which is incorporated by reference. In those cases, the longitudinal axis of the arc tube is generally horizontal in operating position, but is angularly offset vertically from the aiming axis of the reflector. Offset from both the aiming axis of the reflector and horizontal is also possible. Note how the lamp in U.S. Pat. No. 5,134,557 can enter off-axis through the side of the reflector.

A lamp of this type (FIG. 10), in operation, normally results in arc tube 12 being angled downwardly between 15 and 45 degrees from horizontal. This can interject an even additional light depreciation problem. It is well known in the art if one operates an arc tube other than horizontally and vertically, what is called "tilt factor" can result, and usually results. Up to 15%–20% light depreciation occurs. It is believed that unequal temperatures between portions of arc tube 12, caused by tipping the arc tube from horizontal or vertical, allow precipitation out of chemicals, similar to described earlier, but over and above the light depreciation for a horizontally operating lamp. Thus, even more total light loss from an arc tube 12 in the configuration of the fixture of FIG. 9 can occur than in the configuration of FIG. 4.

Figure 11:
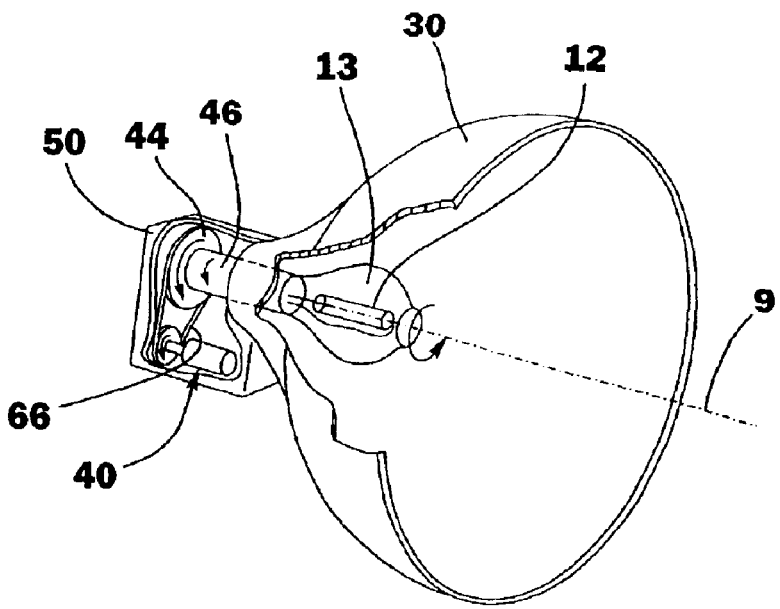
FIG. 11 is a diagrammatic, simplified perspective depiction of the fixture of FIG. 9.
Figure 12:
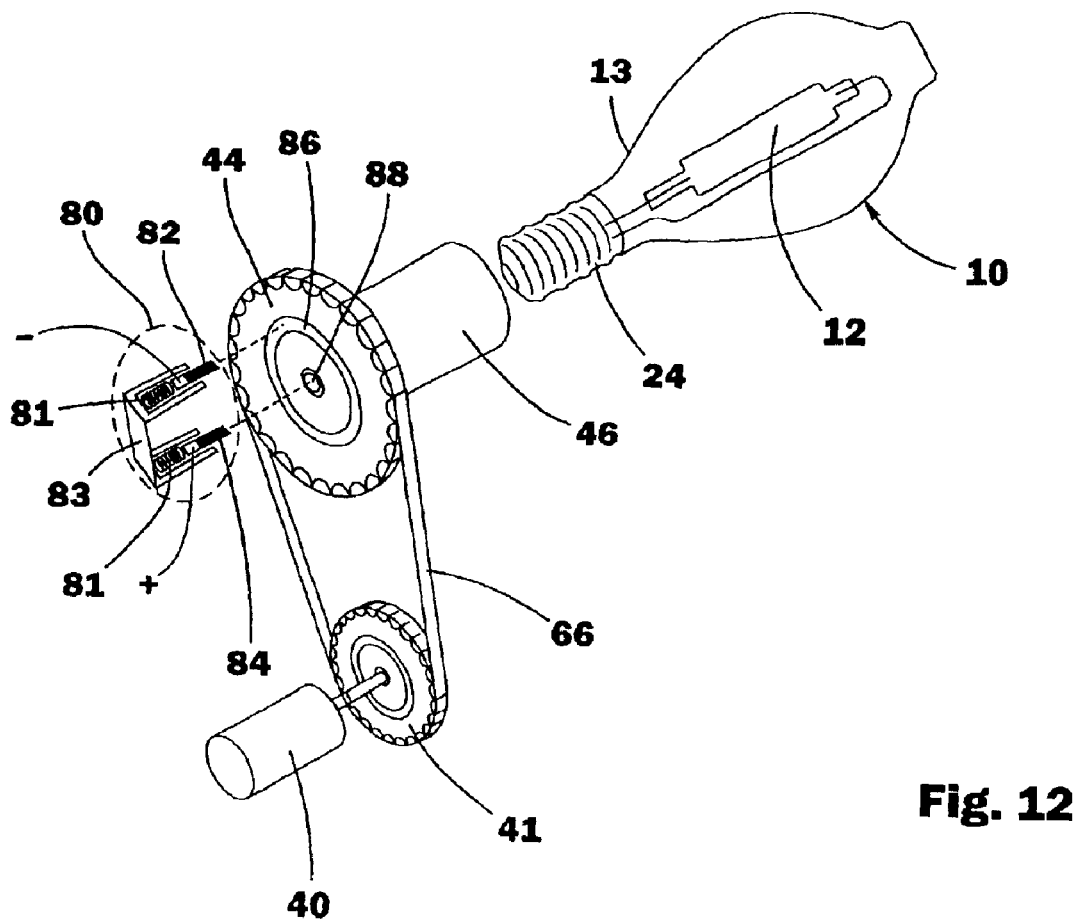
FIG. 12 is an enlarged, isolated diagrammatic perspective view of the mechanism to rotate the lamp in the fixture of FIG. 9.

Rotation of the arc tube 12 around its longitudinal axis can be accomplished as shown in FIGS. 11 and 12. A DC or AC low power electric motor 40 could operate in conjunction with a member 44 (e.g. by teeth around the perimeter of member 44, or a cogged drive belt 66), to rotate a receiver 46/member 44 to which arc lamp is connected. A housing 50 could encase these components. Operation of motor 40 could turn a gear or member 41, which moves a continuous chain, gear, or belt 66, which turns member or gear 44, which in turn turns receiver 46, which in turn rotates lamp 10. Arc tube 12 rotates with lamp 10. Thus, again, isothermal conditions of arc tube 12 are promoted.

Electrical power can be provided to arc tube 12 through a rotary electrical connector or joint, such as described above. FIG. 12 diagrammatically illustrates that positive and negative electrical power could be supplied to two spring-loaded (ref. no. 81) brushes or fingers 82 (copper/graphite) held rigidly in a frame 83 or other structure that is non-moveably positioned adjacent rotating member 44. This arrangement is more of a "pancake" type rotary electrical joint. Electrically conducting rings or portions 86 and 88 can be electrically connected to the receiver 46 in a manner such that when the screw-in base of the arc lamp is operatively installed in receiver 46, electrical power through brushes 82 and 84 can be continuously communicated to the electrodes of arc tube 12. Again, widely available, off-the-shelf rotary electrical connectors exist for this purpose.

The embodiment of FIGS. 9–12 thus illustrates a way to promote isothermal conditions of the arc tube 12 inside a single-ended jacketed HID lamp by rotation of arc tube 12. But, as mentioned, this is intended to illustrate one out of many other configurations pertinent to the method and apparatus of the invention, and not be limitation to the configurations possible. Such single-ended lamps could be jacketed or unjacketed, and could be mounted on-axis with the reflector, or off-axis.

Several tests were conducted with rotating arc tubes. Tables 1–5 below are summaries of the tests for a 1300 watt, 1500 watt, 1750 watt, and 2000 watt MH arc tube respectively (double-ended, unjacketed, of the configuration of FIGS. 2–8). The first column shows the revolutions per minute. The second column indicates the temperature in degrees Celsius of the top and bottom of the arc tube respectively once the lamp has been operating for over 0.3 hour. Temperature was taken by infrared imaging so that no component touched the arc tube (which could possibly draw heat away). Note that the bottom row is a measurement when the arc tube is held static (i.e. not rotated, and thus no RPM), and thus provides a comparison of different rotation speeds to a non-rotating lamp.

TABLE 1

TEST 1
Rotating 1300 Watt Lamp in Fixture

| RPM | Temp (° C.) Top Bottom | Difference (° C.) |
|---|---|---|
| 1 | 829° C. Top | 47 |
|   | 782° C. Bottom |    |
| 2 | 806° C. Top | 16 |
|   | 790° C. Bottom |    |
| 3 | 802° C. Top | 9 |
|   | 793° C. Bottom |    |
| 5 | 801° C. Top | 7 |
|   | 794° C. Bottom |    |
| STATIC | 890° C. Top | 190 |
|   | 700° C. Bottom |    |

Note how the difference between measured temperature between the top and bottom of the arc tube as it rotates has decreased substantially compared to the control measurement of the arc tube operated in a static position (not rotated).

TABLE 2

TEST 2
Rotating 1500 Watt Lamp in Fixture

| RPM | TEMP | Difference (° C.) | WATTS | Light Meter Cone |
|---|---|---|---|---|
| 1 | 856° C. Top | 39 | 1505 | 229 |
|   | 817° C. Bottom |    |      |     |
| 2 | 837° C. Top | 9 | 1502 | 230 |
|   | 828° C. Bottom |    |      |     |
| 3 | 834° C. Top | 1 | 1500 | 230 |
|   | 835° C. Bottom |    |      |     |
| 5 | 829° C. Top | 6 | 1502 | 230 |
|   | 835° C. Bottom |    |      |     |
| STATIC | 907° C. Top | 169 | 1504 | 229 |
|   | 738° C. Bottom |    |      |     |

Table 2 includes a column relating to the wattage of the lamp for each test (which shows the wattage remains similar and close to its wattage rating whether rotated at 1, 2, 3 or 5 RPM or held static. It also includes a column relating to a "light meter cone" measurement, which indicates a relative amount of light measured from the lamp during each temperature measurement. This indicates that whether the arc tube is rotated or held static, the relative amount of light from the lamp is about the same.

TABLE 3

TEST 3
Rotating 1750 Lamp in Fixture

| RPM | TEMP | Difference (° C.) | WATTS | Light Meter Cone |
|---|---|---|---|---|
| 1 | 884° C. Top | 37 | 1755 | 279 |
|   | 847° C. Bottom |    |      |     |
| 2 | 872° C. Top | 10 | 1754 | 279 |
|   | 862° C. Bottom |    |      |     |
| 3 | 865° C. Top | 1 | 1752 | 279 |
|   | 866° C. Bottom |    |      |     |
| 5 | 863° C. Top | 4 | 1750 | 277 |
|   | 867° C. Bottom |    |      |     |
| STATIC | 930° C. Top | 145 | 1747 | 276 |
|   | 785° C. Bottom |    |      |     |

TABLE 4

TEST 4
Rotating 2000 Watt Lamp in Fixture

| RPM | TEMP | Difference (° C.) | WATTS | Light Meter Cone |
|---|---|---|---|---|
| 1 | 917° C. Top | 40 | 1989 | 322 |
|   | 877° C. Bottom |    |      |     |
| 2 | 899° C. Top | 12 | 1987 | 325 |
|   | 887° C. Bottom |    |      |     |
| 3 | 893° C. Top | 5 | 1987 | 326 |
|   | 888° C. Bottom |    |      |     |
| 5 | 890° C. Top | 1 | 1982 | 323 |
|   | 891° C. Bottom |    |      |     |
| STATIC | 952° C. Top | 133 | 1987 | 322 |
|   | 819° C. Bottom |    |      |     |

As can be seen, in these tests indicate rotation promotes isothermal conditions. Operated in a static (non-rotating) conventional position, temperature difference between top and bottom of the arc tube was around 130° C. or more. Rotation, even just 1 RPM, resulted in the top temperature reducing about 40 to 60° C., and the bottom temperature increasing about 60 to 80° C. At one RPM, this represents an almost 50 percent reduction in temperature difference between top and bottom. At higher RPM of rotation, top and bottom temperature offset appear to become smaller; in some cases only 1 or 2 degrees apart.

Note that the tests of Tables 2, 3 and 4 indicate higher rotational speeds may promote better isothermal conditions. The tests also indicate that there might not be substantial gain for higher speeds over 3 RPM. Thus, a reasonable balance of factors indicates that lower rotation speed may be preferable. Less wear and tear on equipment would occur. Less bearing wear would likely occur. There would likely be less stress on the lamp and less stress on the electrical surfaces of the slip rings or similar device. There would likely be less movement or bouncing of the arc, which can occur during operation of HID lamps, and which may be exacerbated the faster the arc tube is rotated. Also, It might allow lower cost devices and structure than if rotation at relatively high speeds, e.g. well over 30 RPM.

It is to be understood that there are other factors that can affect light output of an HID lamp over operational life. Some are not believed influenced or reduced by rotation of the arc tube. Therefore, it is not believed that exact isothermal conditions around the arc tube are needed to provide improvement in light output maintenance over the life of a lamp, and that a balancing of factors associated with such lamps indicates that a reasonable selection would be rotation at the slower RPMs rather than higher, although higher are certainly possible and not excluded. It appears that rotation of the arc tube, promotes equalization of temperature around the arc tube, and that some rotation promotes a decrease in the difference of temperatures normally seen in statically operated lamps. Therefore, even some narrowing of the difference appears to be useful and beneficial. Higher speeds may bring the temperature difference even closer, but perhaps only marginally or not enough to justify the higher speeds. Therefore, flexibility in the rotation speed exists relative to what the designer desires for an application.

Table 5 shows an indication of light output at different points in operational life for a rotated MH lamp (row one of Table 5) compared to the average for several different MH arc lamps of various manufacturers that are not rotated (row two of Table 5), including a lamp of the same chemistry as the rotating lamp. The test was conducted uses what are termed "five hour starts", meaning the lamp is turned on and run for five hours, turned off for one hour, and this is then repeated (i.e. five hours on, one hour off, five hours on, one hour off, etc.) As can be seen, the light output (in lumens per watt) of the lamp that is rotated (row 1 of table 5), does not seem to deteriorate as significantly as with non-rotated arc tubes (row 2). The rotated arc tube measured at about 90% of initial light output after 1000 hours of operation. In comparison, the non-rotated arc tubes ranged from a high of about 80% of original light output to about 45% (an average of about 59%) at 1000 hours of operation.

In particular, the test of Table 5 indicates that the actual amount or quantity of light from the lamp is maintained better when the lamp is rotated than when not. Compare 110 lm/w output of the rotated lamp at 1,000 hours of five hour start operation to an average of about 59 lm/w for the non-rotating lamps. The rotating lamp started with about 123 lm/w output (at 0.3 hour of operation) and measured 110 lm/w at 1000 hours. The non-rotating lamps started with an average of about 131 lm/w (at 0.3 hours of operation) and averaged about 59 lm/w at 1000 hours. It can be seen that the rotating lamp had much better lumen maintenance (less light depreciation) than the non-rotating lamps. The individual measures for each of the non-rotating lamps in the test of Table 5 were fairly similar. Other tests appear to corroborate these results. Also, it appears that light life is extended.

air distribution head relative to that specific light fixture. There are alternative ways to deliver air to the lamp. For example, slots or other structure (instead of holes) could be used to direct air to a certain location.

Air distribution end 34 would provide a curtain or "spray" of low pressure air 38 onto the top of arc tube 12. Even a small amount of air at low pressure has been found to cool the top of arc tube 12 during operation and tends to promote equalization of temperature between top and bottom, and indeed around the arc tube 12. Instead of an about 1000° C. top temperature and about 700° C. bottom temperature, it has been found that the top can be cooled to closer to the bottom of the arc tube.

During the first 100 hours of operation, one may not be able to eliminate light depreciation, but it appears to slow it down or reduce it. After 100 hours, it appears possible to slow down or eliminate further depreciation.

It has also been found that it is beneficial to cool the top some, but not too much. Therefore, low pressure is used. If the top is overcooled, it could cause the same problem as with no cooling; one side hotter than the other. Too much cooling can reduce light output to an excessive degree.

Figure 17:
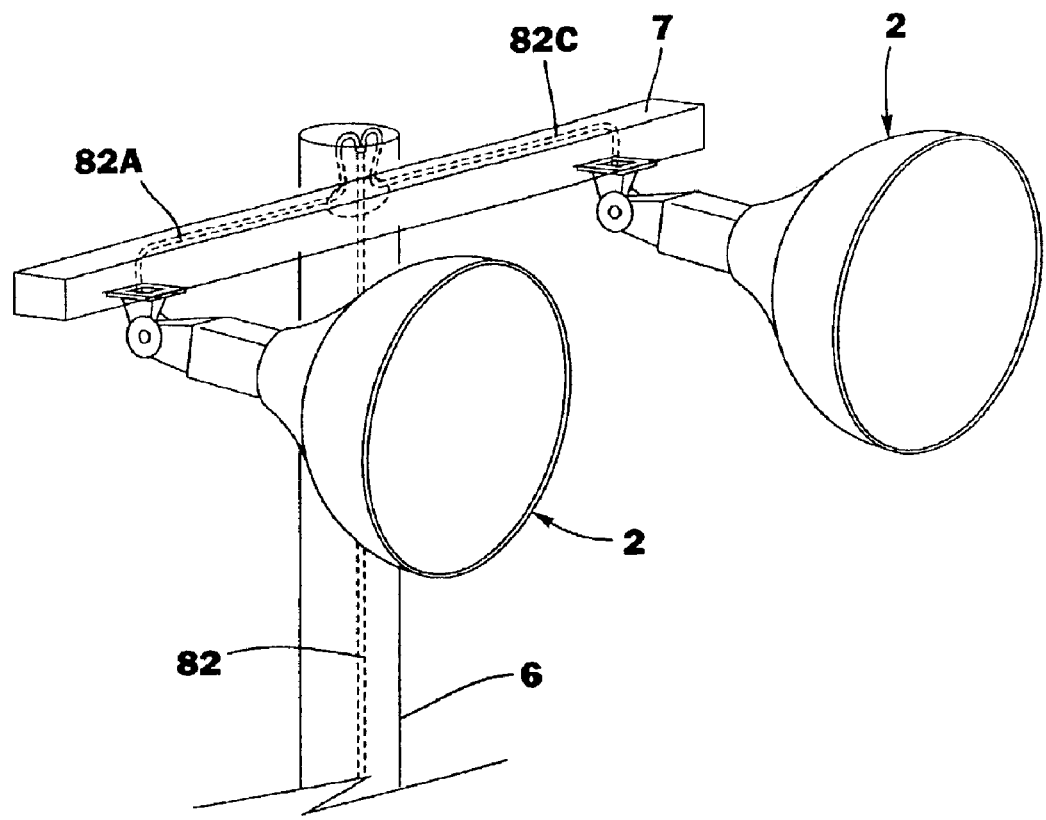
FIG. 17 is a reduced scale perspective depiction of a mechanism to generate pressurized air and to deliver it to one or more light fixtures at the top of a light pole.
Figure 17:
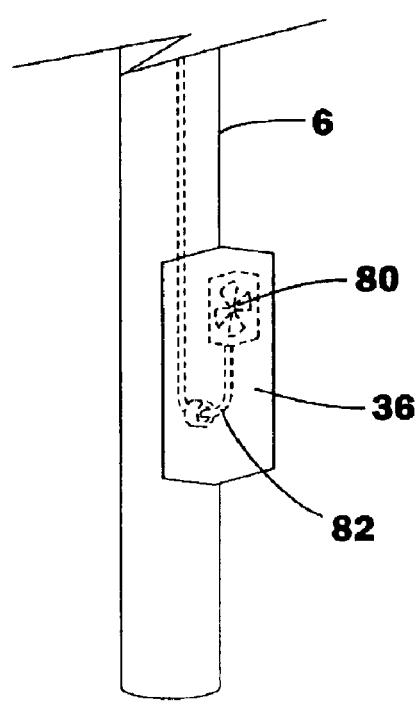

In this embodiment, because only low pressure air is needed, it greatly reduces the cost and complexity of pressurized air source 36. It could be just a low power DC fan 80 (see FIG. 17) instead of some sort of air compressor, but

TABLE 5

| | | | | | Lamp Summary (Lumens per Watt) (% of Initial) | | | | | | |
|---|---|---|---|---|---|---|---|---|---|---|---|
| | Lamp | 0.3 Hr | | 20.0 Hr. | | 100.0 Hr | | 300.0 Hr | | 700.0 Hr | | 1,000.0 Hr |
| 1 | Rotated | 122.7 | 100.0% | 126.9 | 103.4% | 126.9 | 103.4% | 123.6 | 100.7% | 115.6 | 94.2% | 110.6 | 90.1% |
| 2. | Avg. of 5 non-rotated lamps | 131.5 | 100.0% | 116.2 | 88.8% | 96.3 | 73.7% | 86.3 | 66.1% | 80 | 61.4% | 75.8 | 58.2% |

1. Rotating lamp (2 KLamp). Rotating Lamp Chemistry: 61 MG of salts made up of: 81.7% Sodium Iodide, 9.2% Scandium Iodide, 8.2% Cesium Iodide, .9% Thallium Iodide, plus 109 MG of Mercury and .5 MG of Scandium metal.
2. Static (non-rotating lamps standard lamps).

Lumens per watt (lm/w) is a measure of the efficacy of a light source in terms of the light produced for the power consumed. Per cent "of initial" in Table 5 is the percentage of light remaining compared to 0.3 hrs of run time.

Figure 13:
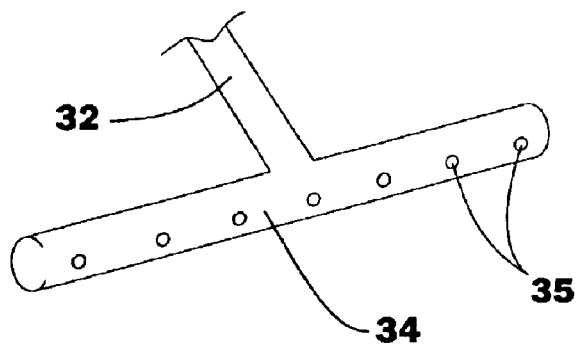
FIG. 13 is an enlarged, isolated perspective view of the distal end of an air distribution head that can be used to direct pressurized air onto or towards an arc tube during operation, according to another embodiment according to the present invention.
Figure 14:
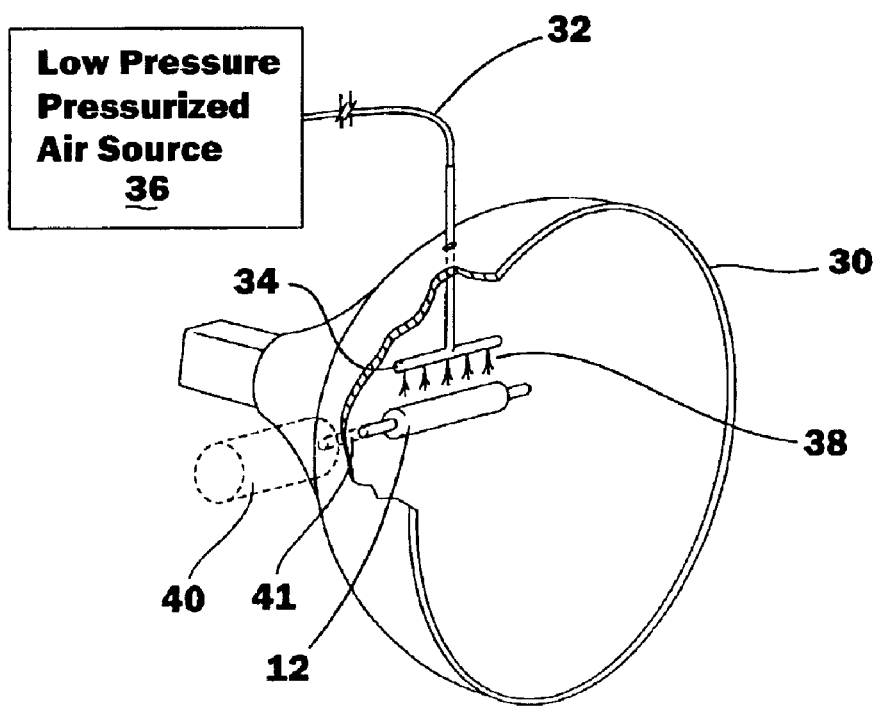
FIG. 14 is a diagrammatic perspective view illustrating one example of distributing pressurized air to the top of an arc tube, using the distribution head of FIG. 13.

C. Exemplary Embodiment Example 2—Blowing Air on the Arc Tube to Equalize Temperature Around the Tube FIGS. 13 and 14 illustrate an alternative way to promote isothermal conditions around an arc tube. In the example of FIG. 14, an unjacketed, double-ended arc tube 12 (like that of FIGS. 2 and 3) is shown in a horizontal position in a fixture. Again, mounting structure to support arc tube inside a reflector 30 is not shown. A variety of ways are possible to do so. One is shown in FIG. 2.

A low-pressure pressurized air source 36 is selectively controllable to issue low pressure (e.g. from well under 1 PSI (e.g. 1 inch or less of static water pressure) to perhaps on the order of 20 PSI) air through air conduit 32 to an air distribution distal end or head 34 above arc tube 12. FIG. 13 illustrates that end 34 can have a plurality of spaced apart openings 35 which would distribute air (see ref. no. 38 of FIG. 14) over the top of arc tube 12. See also FIG. 2, the broken lines at ref. Numbers 32, 34, and 36, which show an a compressor or other sources are possible. It is even possible to pressurize air within the cross arm and light pole and deliver air through the same into the mounting elbow for each fixture via tubing 82, to reduce external air tubing, and in fact, eliminate the need for tubing to each fixture (see FIG. 17).

One method of dealing with light depreciation is to increase wattage to the arc tube 12 as the lamp, in operation hours, gets older. This could be done by gradually increasing the wattage to the arc tube electrodes, for example, by increasing capacitance in the electrical circuitry powering the electrodes of the arc tube. An increase in wattage would increase the light output of arc tube 12. Thus, even if light depreciation caused by unequal temperature occurred, more light output would be created to try to offset it. However, increased wattage and increased light output means increased temperature, which can increase loading on the lamp. This could not only cause light depreciation, but decrease life of the lamp and even cause failure of the arc tube itself.

Figure 15:
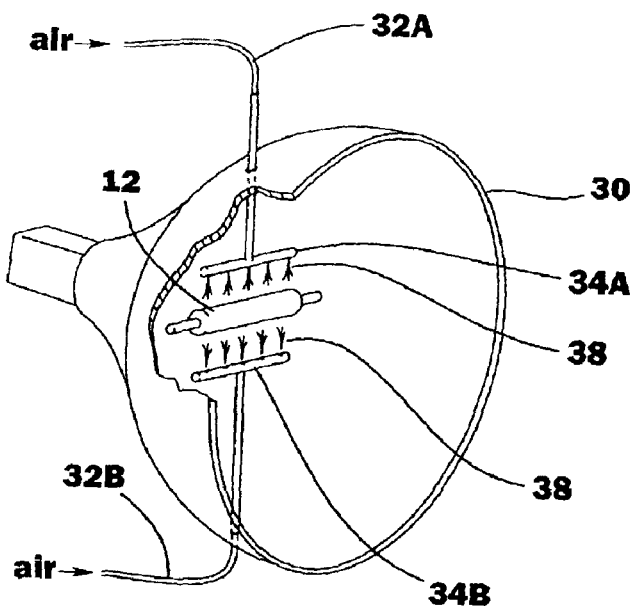
FIG. 15 is similar to FIG. 14 but additionally shows a second air distribution head for directing pressurized air to another part of the arc tube.

Therefore, as another example of the invention, both top and bottom of arc tube 12 could be cooled (see FIG. 15). An air conduit and air distribution head 32B and 34B could be added essentially identical to that described earlier regarding conduit 32 and distribution head 34. By appropriate valving or control, air could be sprayed on top of arc tube 12 in the same or different amounts or at the same or different times as the bottom of arc tube 12. Through experiment, it could be determined how much air is needed for either combating a hotter topside of arc tube 12 because of normal operation, and/or combating heating at both top and bottom because of increasing wattage to the lamp.

Figure 16:
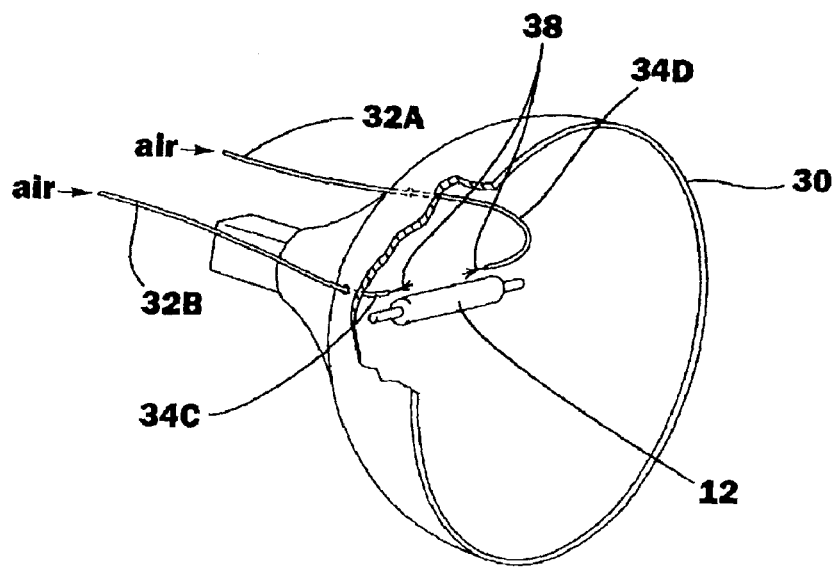
FIG. 16 is similar to FIG. 14 but illustrates a different air delivery system to the top of an arc tube.

FIG. 16 illustrates an alternative configuration, where air hoses 32 blow air across the arc tube 12 through air hose ends 34C and D. The hose ends (they could have fittings or nozzles) could be directed to other parts of the arc tube (e.g. top and bottom). Other methods of delivering air to arc tube 12 are, of course, possible.

It is to be understood that while this exemplary embodiment illustrates directing air onto an unjacketed arc tube, it could also be directed onto a portion of the jacket of a jacketed lamp. For example, air could be directed onto the top part of the jacket directly over the top part of the arc tube in the jacket to promote cooling of the top of the arc tube. It is more difficult to spot cool the arc tube. More air or increased pressure of air might be needed. But again, this promotes cooling of the top of the arc tube (or a hotter part of the arc tube), which promotes increased lamp life and improved lm/w maintenance over the operational life of the lamp. On the other hand, it may be possible to deliver air through the jacket and directly on the arc tube. In the case of directing air or gas onto the jacket of a jacketed lamp, it may improve performance and lamp life of lamps of the type shown in U.S. Pat. No. 5,856,721, incorporated by reference, which have an arc tube offset from the longitudinal axis of the lamp. Therefore, promotion of isothermal conditions can be practiced on a lamp which would not likely be rotated, because rotation could cause variation of the light pattern issuing from a fixture using such a configuration.

Furthermore, it is possible to direct or blow air or gas over an entire static jacket of a static (non-rotated) jacketed lamp, to promote cooling of the lamp and arc tube generally, to promote better performance and/or life of the lamp.

D. Options and Alternatives

It will be appreciated that the present invention can take many forms and embodiments. The included exemplary embodiments are given by way of example, only, and not by way of limitation the invention, which is solely described by the claims herein. Variations obvious to one skilled in the art will be included with the invention defined by the claims.

For example, the precise way an arc tube or lamp is rotated can be designed according to choice and need. Similarly, the precise way to deliver pressurized gas or air can vary according to the skill of those skilled in the art.

The specific speed, duration, direction of rotation, or amount, type, location, pressure of cooling gas can be varied according to desire and need. It is believed that variations likely will be needed between arc tubes, both of the same or different manufacturers or types. HID lamps have many variables, including the materials from which they are made, the chemicals and amounts inside, the way they are made, the amount of electrical power with which operated, etc. Optimization, or selective amount of equalization or variance of temperature around the arc tube, can be chosen by the designer; sometimes which conventional trial and error or empirical methods. It could be desirable to get the temperature of the arc tube as hot as possible, without degrading the quartz. This may increase performance of the lamp. However, this may alter how the lamp is constructed (e.g. size of arc tube, shape of arc tube, size of electrodes, etc.) and affect what chemicals can be used in the arc tube (e.g. some chemicals may not operate well at higher temperatures).

For example, it might be desired to maximize the equalization of temperature. Testing and trial and error could be conducted to attempt to reveal the same for each lamp. On the other hand, a general rule for a type of lamp might be applied by experimenting with one lamp. It might be satisfactory to apply the same rotation or cooling air to any of a make of lamp, even though isothermal conditions would not be optimized for each lamp.

Another example of an option according to the invention is as follows. It might be desirable to combine both rotation of the arc tube and directing pressurized air or gas onto it. FIG. 14 illustrates the general idea by showing diagrammatically in broken lines a motor 40 and connection 41 to arc tube 12. Optionally, both rotation and air cooling can take place simultaneously or separately. As mentioned above, the combination of rotation and direction of air or gas can be used on jacketed or unjacketed lamps, single-ended or double-ended, and of various other characteristics.

Note that there are other potential advantages to this invention. Equalized or isothermal temperatures is believed to potentially produce better color of light for such things as sports lighting, and may actually lengthen lamp life over conventional lamp lives.

Further options are believed viable. For example, by selecting and controlling the system, one could not only begin by cooling the top of the arc tube during normal operation, but also at some point, slowly raise the wattage of the lamp and cool top and bottom. This might allow production of additional light energy from the lamp not possible with standard methods.

Another optional possibility is to utilize one or more of the described embodiments to reduce restrike time for arc tube 12. Normally, these types of arc tubes obtain such hot temperatures, they need to cool down substantially when turned off before they can be restruck to begin to turn them on again. By using the pressurized air, one could selectively cool the arc tube down quicker when turned off. It is believed that this would allow quicker restrike.

One also might be able to build different and more optimized arc lamp sources. For example, presently, the size of the electrodes could be made larger for a given size arc tube and more wattage applied to the arc tube because it could be cooled, or isothermal conditions promoted (e.g. reduction in temperature of the top relative the bottom). However, the more wattage, the hotter the arc tube 12 becomes. If too much wattage is allowed, it could overheat the quartz to the point of failure. By having the option to cool the quartz arc tube 12, bigger electrodes, more wattage, and more light output might be possible. Also, it may allow for different or more chemicals to be inserted into arc tube 12 to produce more light because even though more light would generate more heat, the promotion of more isothermal conditions might allow the lamp to handle the additional heat. Furthermore, it may allow the avoidance of certain chemicals, such as stabilizers that try to stabilize the arc stream but many times result in precipitation or blackening of the inside of the arc tube and thus, reduce light output.

Please note that there are other potential advantages to this invention. Equalized cooling is believed to potentially produce better color of light for such things as sports lighting, and may actually lengthen lamp life over conventional lamp lives.

What is claimed is:

1. A method of improving performance of operation of a relatively large wattage metal halide HID lamp used in wide area lighting such as sports lighting, regardless of orientation relative to horizontal or vertical, the HID lamp having an arc tube comprised of a light transmissive tube elongated along a longitudinal axis and of generally consistent cross-sectional diameter with pinched opposite ends, comprising:
   a) operating the HID lamp, the HID lamp having a rating of 1,000 watts or larger;
   b) promoting isothermal conditions for the arc tube by rotating the arc tube at between a fraction of an RPM and ten RPM around its longitudinal axis during operation to increase lumens per watt of energy from the HID lamp at least during at least an initial amount of cumulative operation time, without blowing air or gas on the arc tube.

2. The method of claim 1 wherein the HID lamp is a jacketed or an unjacketed arc tube.

3. The method of claim 1 wherein the HID lamp is one or a single-ended or double-ended lamp.

4. The method of claim 1 wherein the rotating comprises continuous rotating during operation of the lamp.

5. The method of claim 4 wherein the continuous rotation is between a fraction of an RPM and 10 RPM.

6. An apparatus for improving performance of operation of a relatively large wattage metal halide HID lamp used in wide area lighting such as sports lighting, regardless of orientation relative to horizontal or vertical, the HID lamp having an arc tube comprised of a light transmissive tube elongated along a longitudinal axis and of generally consistent cross-sectional diameter with pinched opposite ends, comprising:
   a) an HID arc lamp having a rating of 1,000 watts or larger;
   b) means for promoting isothermal conditions for the arc tube by rotating the arc tube at between a fraction of an RPM and ten RPM around its longitudinal axis during operation to increase lumens per watt of energy from the HID lamp at least during at least an initial amount of cumulative operation time, without blowing air or gas on the arc tube.

7. The apparatus of claim 6 wherein the HID lamp is one of a jacketed or unjacketed arc tube.

8. The apparatus of claim 6 wherein the HID lamp is one of a single-ended or double-ended lamp.

9. The apparatus of claim 6 wherein the means comprises an actuator operatively connected to the arc tube to rotate the arc tube.

10. The apparatus of claim 9 wherein the actuator rotates the arc tube in one direction multiple revolutions.

11. The apparatus of claim 9 wherein the actuator rotates the arc tube in a first direction for a first angular amount, and then in a second direction.

12. An apparatus for improving performance of operation of a relatively large wattage metal halide HID lamp used in wide area lighting such as sports lighting, regardless of orientation relative to horizontal or vertical, the HID lamp having an arc tube comprised of a light transmissive rube elongated along a longitudinal axis and of generally consistent cross-sectional diameter with pinched opposite ends, comprising:
   a) a fixture including a support to hold the HID arc lamp with the elongated arc tube in operative position and an optical system to reflect and direct substantially all light from the arc lamp in a controlled concentrated beam out of the fixture to a distant target;
   b) a mechanism mountable to the fixture, the mechanism operatively connected to the arc tube to promote isothermal conditions for the arc tube by rotating the arc tube at between a fraction of an RPM and ten RPM around its longitudinal axis during operation to increase initial lumens per watt of energy from the HID lamp during operation to increase lumens per watt of energy from the HID lamp during at least an initial amount of cumulative operation time, without blowing air or gas on the arc tube.

13. An HID lamp fixture for improving performance of operation of relatively large wattage metal halide HID lamps used in wide area lighting such as sports lighting, regardless of orientation relative to horizontal or vertical, the HID lamp having an arc tube comprised of a light transmissive rube elongated along a longitudinal axis and of generally consistent cross-sectional diameter with pinched opposite ends, comprising:
   a) a housing, the housing including
      (1) a connection adapted for mounting the housing to elevated position;
      (2) a mount to operatively mount a light source including an arc tube;
      (3) a mount for a reflector wherein the reflector is situated to direct substantially all light from the arc lamp in a controlled concentrated beam out of the fixture to a distant target;
   b) a mechanism mounted on the fixture to promote isothermal conditions on the arc tube by rotating the arc tube at between a fraction of an RPM and ten RPM around its longitudinal axis during its operation to increase lumens per watt of energy from the HID lamp during at least an initial amount of cumulative operation time, without blowing air or gas on the arc tube.

14. The apparatus of claim 13 wherein the fixture comprises an actuator operatively connected to the arc tube to rotate the arc tube.

15. The apparatus of claim 13 wherein the fixture comprises an actuator operatively connected to the arc tube to rotate the arc tube and a conduit operatively connectable to a source of pressurized gas, the conduit positioned to direct pressurized gas onto at least a portion of the arc tube.

* * * * *

UNITED STATES PATENT AND TRADEMARK OFFICE
CERTIFICATE OF CORRECTION

PATENT NO. : 6,929,385 B2
DATED : August 16, 2005
INVENTOR(S) : Gordin, Myron K. et al.

It is certified that error appears in the above-identified patent and that said Letters Patent is hereby corrected as shown below:

Column 17,
Line 41, should read -- the HID lamp during at least an initial amount --.

Signed and Sealed this

Eighteenth Day of October, 2005

JON W. DUDAS
*Director of the United States Patent and Trademark Office*